(12) United States Patent
Biggerstaff et al.

(10) Patent No.: US 8,801,512 B2
(45) Date of Patent: Aug. 12, 2014

(54) METHOD FOR MEASURING AIR EFFICIENCY AND EFFICACY IN A COMBINE HARVESTER

(71) Applicant: AGCO Corporation, Duluth, GA (US)

(72) Inventors: Joseph M. Biggerstaff, Wichita, KS (US); Alan R. Bergkamp, Wichita, KS (US)

(73) Assignee: AGCO Corporation, Duluth, GA (US)

(*) Notice: Subject to any disclaimer, the term of this patent is extended or adjusted under 35 U.S.C. 154(b) by 51 days.

(21) Appl. No.: 13/719,930

(22) Filed: Dec. 19, 2012

(65) Prior Publication Data

US 2013/0157731 A1    Jun. 20, 2013

Related U.S. Application Data

(60) Provisional application No. 61/577,369, filed on Dec. 19, 2011.

(51) Int. Cl.
*A01F 12/48* (2006.01)

(52) U.S. Cl.
USPC .......................................................... 460/99

(58) Field of Classification Search
USPC ............. 460/99, 100, 101, 44, 111, 112, 109, 460/81; 241/222; 239/689; 209/395, 639, 209/138; 701/44, 50, 51; 415/53.3, 53.1, 415/184

See application file for complete search history.

(56) References Cited

U.S. PATENT DOCUMENTS

| | | | | |
|---|---|---|---|---|
| 5,795,223 | A * | 8/1998 | Spiesberger et al. | 460/102 |
| 6,773,343 | B2 * | 8/2004 | Grywacheski et al. | 460/99 |
| 8,052,374 | B2 * | 11/2011 | Ricketts | 415/53.1 |
| 8,221,064 | B2 * | 7/2012 | Ricketts et al. | 415/184 |
| 8,286,798 | B2 * | 10/2012 | Ricketts et al. | 209/138 |
| 8,608,534 | B1 * | 12/2013 | Stahl et al. | 460/99 |
| 8,616,945 | B2 * | 12/2013 | Ritter et al. | 460/44 |

* cited by examiner

*Primary Examiner* — Robert Pezzuto

(57) ABSTRACT

The airflow through a harvesting machine is adjusted by calculating a G-factor at a first point on an upper chaffer to determine if it is greater than 1+n, where n represents a desired factor. A blower is adjusted to reduce an airstream if the G-factor is greater than 1+n. A MOG factor is calculated if the G-factor is less than 1+n. The blower is adjusted to increase the airstream if the MOG-factor is less than 1+x, where x represents a desired factor. A MOG-factor is calculated at a second point if the MOG-factor at the point is greater than 1+x and the blower is adjusted to reduce the airstream if the MOG-factor at the second point is greater than 1+y, where y represents a desired factor or adjusted to increase the airstream if the MOG-factor at the second point is less than 1+y.

2 Claims, 3 Drawing Sheets

METHOD FOR MEASURING AIR EFFICIENCY AND EFFICACY IN A COMBINE HARVESTER

RELATED APPLICATION

Under provisions of 35 U.S.C. §119(e), Applicants claim the benefit of U.S. Provisional Application No. 61/577,369 filed Dec. 19, 2010, which is incorporated herein by reference.

BACKGROUND OF THE INVENTION

1. Field of Invention

This invention relates to threshing and cleaning systems for combine harvesters, and more particularly, to method for managing the airflow of a blower mechanism through the threshing and cleaning systems of the combine harvester.

2. Description of Related Art

Combine harvesters have a threshing mechanism for threshing the harvested crop and a cleaning system used to remove chaff and other residue from the threshed crop. In one example, a rotor cooperates with concaves to thresh the harvested material, and initial separation occurs as grain and smaller residue are pushed through the grated concaves by centrifugal force to the cleaning system. Large residue pieces such as stalks and stems continue to move rearwardly and are eventually discharged out the rear end of the rotor assembly where it is acted upon by a chopper or spreader and deposited on the ground.

Within the cleaning system, oscillating sieve assemblies in conjunction with air flow remove the chaff from the threshed grain, which gravitates through the chaffer and sieve assembly to an oscillating clean grain pan. The clean grain pan, in turn, directs the clean grain to a discharge auger that elevates the grain to an onboard storage bin. A second oscillating pan directs materials other than grain over the edge of the bottom sieve assembly to a different discharge outlet for recirculation back through the threshing, separating and cleaning apparatus to extract the previously unthreshed grain.

A blower may be used to produce an airstream that entrains the lighter non-grain particles and carries them out the rear of the harvester. However, it can be challenging to control the airflow from the blower to get an even distribution of air across both the threshing mechanism and the cleaning system.

SUMMARY OF THE INVENTION

In an example embodiment, the invention is directed to a method of managing the airflow of a blower mechanism through the threshing and cleaning systems of a combine harvesting machine. The method includes calculating a G factor at a first point on an upper chaffer that is just underneath the forward edge of a grain pan to determine if the G factor at said first point is greater than 1+n, where n represents a desired factor. The method includes adjusting the blower mechanism to reduce an airstream, thereby causing a reduction in the rearward movement of grain if the G factor at said first point is greater than 1+n. The method also includes calculating a MOG factor at said first point if the G factor calculated at said point is less than 1+n. The blower mechanism is adjusted to increase the airstream so as to entrain more MOG if the MOG factor at said first point is less than 1+x, where x represents a desired factor. The method also includes calculating a MOG factor at a second point if the MOG factor at said first point is greater than 1+x and adjusting the blower to reduce the airstream if it is determined the MOG factor at said second point is greater than 1+y, where y represents a desired factor or adjusting the blower to increase the airstream if it is determined the MOG factor at said second point is less than 1+y.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the combine.

Figure 1:
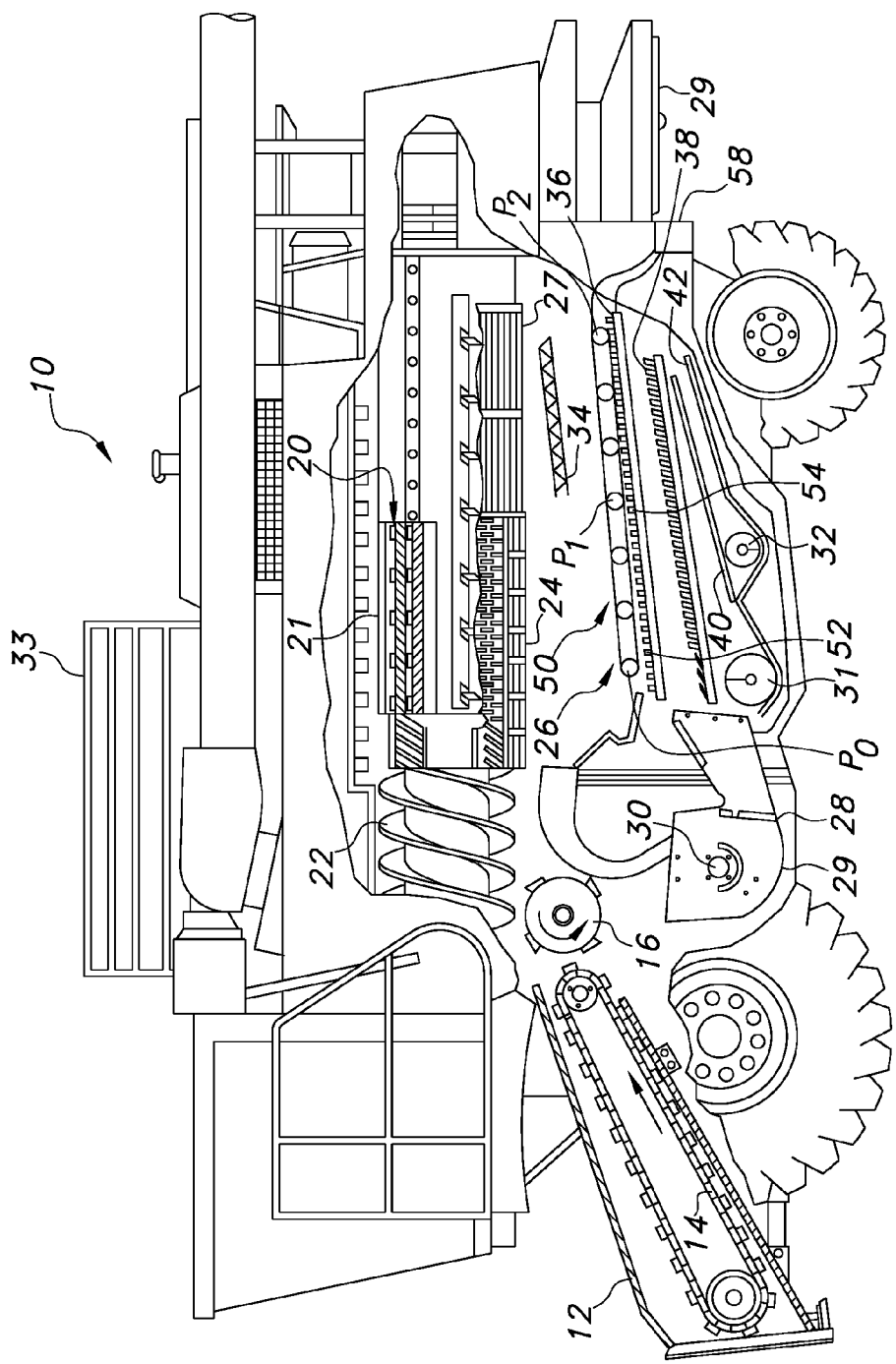
FIG. 1 is a schematic side elevational view of a combine harvester with parts broken away to reveal internal details of the feeding, threshing, separating and cleaning portions of the machine.

FIG. 1 schematically illustrates one type of combine harvester 10 to which the present invention relates. Although the harvester 10 chosen for purposes of illustration is a so-called axial rotary combine in which the threshing mechanism comprises a rotor disposed axially of the machine with respect to its fore-and-aft axis, many other types of threshing and separating mechanisms are currently in commercial use and it is not intended that the principles of the present invention be limited to any one particular type of threshing and separating mechanism.

In relevant part, harvester 10 has a feed housing 12 that receives harvested materials from a suitable header (not shown) and advances such materials upwardly and rearwardly via a conveyor 14 toward a beater 16 rotating in a counterclockwise direction viewing FIG. 1. Beater 16 impels the harvested materials upwardly and rearwardly into a receiving housing 18. Housing 18 contains the front end of a threshing mechanism, broadly denoted by the numeral 20. In the illustrated embodiment, the threshing mechanism 20 comprises a rotor 21 with a front end having a series of helical vanes 22 that start the materials moving rearwardly in a spiral path of travel along the outside of the rotor 21. As the materials move rearwardly, concaves 24 cooperate with rotor 21 to thresh the materials, and initial separation occurs as grain and smaller residue are pushed through the grated concaves region by centrifugal force to the cleaning apparatus 26. Large residue pieces such as stalks and stems continue to move rearwardly past a separating grate 27 which allows grain to pass radially out of the rotor area to cleaning apparatus 26, but not the larger residue. Such residue eventually discharges out the rear end of the rotor assembly where it is acted upon by a chopper or spreader (now shown) and deposited on the ground. One skilled in the art will understand that other threshing and separating mechanisms 20, such as a cylinder and concaves, may be used without departing from the scope of the invention.

Generally speaking, the threshed grain works its way downwardly through the machine as it is acted upon by the cleaning apparatus 26 and a blower 28. The blower 28 has a blower housing 29 which contains a rotatable impeller 30 configured to generate a high-velocity stream of air. The light chaff particles (MOG) become airborne by the rearwardly directed airstream generated by the blower 28 and are discharged out the rear of the machine. Clean grain ultimately finds its way to a discharge auger 31 leading to an elevator that conveys the clean grain up to a storage tank 33 at the top of the machine. Tailings, consisting of some grain along with the other particles of residue, find their way to a tailings return auger 32 which then elevates the tailings via means not illustrated for recirculation back through the threshing, separating and cleaning areas to further separate grain from such residue.

The combine harvester 10 includes as part of its cleaning apparatus 26 an upper oscillating pan 34 that delivers materials received from concaves 24 and grate 27 generally downwardly and forwardly. Those materials from pan 34 land on an upper oscillating upper chaffer 36. The upper chaffer 36 allows grain to pass downwardly through openings in the upper chaffer 36 while larger particles are impelled generally upwardly and rearwardly until being discharged off the rear end of the upper chaffer 36 and out the back of the combine harvester 10 to the ground. A finer oscillating lower sieve 38 receives the grain and residue that has passed through the upper chaffer 36 and performs essentially the same type of classifying function as upper chaffer 36. The smaller kernels of grain fall through the lower sieve 38 and onto an oscillating grain pan 40, which delivers the grain into the clean grain auger 30. The larger tailings particles unable to penetrate lower sieve 38 travel off the rear discharge end of lower sieve 38 and drop to a tailings return pan 42 that feeds such materials to the tailings return auger 32. As the kernels of grain gravitate through upper and lower sieves 36 and 38, the airstream from fan 28 entrains the lighter MOG particles and carries them toward the rear of the harvester 10.

According to the invention, the harvester 10 contains blower effectiveness measuring apparatus 50 used to measure the effectiveness of the airstream from the blower 28 at separating MOG from grain. Desirably, the airstream is strong enough to entrain the MOG and push it toward the rear of the cleaning apparatus 26 without causing grain to be lost out the rear of the cleaning apparatus 26. If the airstream from the blower 28 is not strong enough, MOG remains near the forward part of the upper chaffer 36. If the airstream is too strong, grain is lost out the back of the cleaning apparatus 26 and power consumption of the harvester 10 is higher than necessary as the blower is drawing more power than necessary. The blower effectiveness measuring apparatus 50 is used to adjust operating parameters of the blower 28 to improve the efficiency and effectiveness of the cleaning apparatus 26. Parameters of the blower 28, such as motor speed and position of louvers that direct the air stream, may be adjusted based on information from the blower effectiveness measuring apparatus 50.

The blower effectiveness measuring apparatus 50 contains at least one collection device 52 used to collect samples of the grain and MOG in the space between the concaves 24 and separating grates 27 and the upper chaffer 36. The collection device 52 is configured to collect samples from a point $P_0$ near the front of the upper chaffer 36 rearward to point $P_1$ underneath the forward edge of the upper oscillating pan 34, and continuing rearward to a point $P_2$ near the rear of the upper chaffer 36. It is understood that the collection device 52 may be configured to collect samples at many additional points between the labeled points $P_0$ and $P_2$. The collection device 52 may include a collection tube 54 with a plurality of openings located between the point $P_0$ and $P_2$, or the tube may be positioned on a slide so that samples can be taken along the length of the upper chaffer 36 between points $P_0$ and $P_2$ using sound engineering judgment. The collection device 52 is desirably configured to collect grain and MOG at the sample site for a specified duration of time. In one embodiment, the collection tube has a door that may be selectively opened and closed for the desired amount of time to collect the grain and MOG sample. A plurality of collection devices 52 may be used to collect samples at different points across the width of the cleaning apparatus 26. The grain and MOG collected in the sample collected by the collection device 52 are delivered to a counting device 58 that measures the amount of grain and the amount of MOG in the sample. Desirably, the counting device 58 is located outside the cleaning apparatus 26.

The measurements from the counting device 58 are used to measure the efficiency and efficacy of the airstream from the blower 28. A computer may be used to analyze the measurements from the counting device and generate a signal to control the blower 28 or the measurements may analyzed by a human operator and the blower 28 may be manually adjusted. In one embodiment, a grain effectiveness factor (hereinafter G factor) is calculated. The G factor is a ratio of the amount of grain collected in a sample at a selected point (i.e., $P_1$, $P_2$, etc.) with the blower 28 operating at a specified speed or condition to be tested and the amount of grain in a baseline sample at the selected point with the blower 28 providing no air or a minimal amount of air. The G factor is calculated using the formula of Equation 1:

$$G \text{ factor} = \frac{\text{Grain in sample for blower condition}}{\text{Grain in baseline sample}} \quad \text{(EQ. 1)}$$

Similarly, the analysis device calculates a MOG effectiveness factor (hereinafter MOG factor). The MOG factor is a ratio of the amount of MOG collected in a sample at a selected point (i.e., P1, P2, etc.) with the blower 28 operating at a specified speed or condition to be tested and the amount of MOG in a baseline sample at the selected point with the blower 28 providing no air or a minimal amount of air. The MOG factor is calculated using the formula of Equation 2:

$$MOG \text{ factor} = \frac{MOG \text{ in sample for blower condition}}{MOG \text{ in baseline sample}}$$

Figure 2:
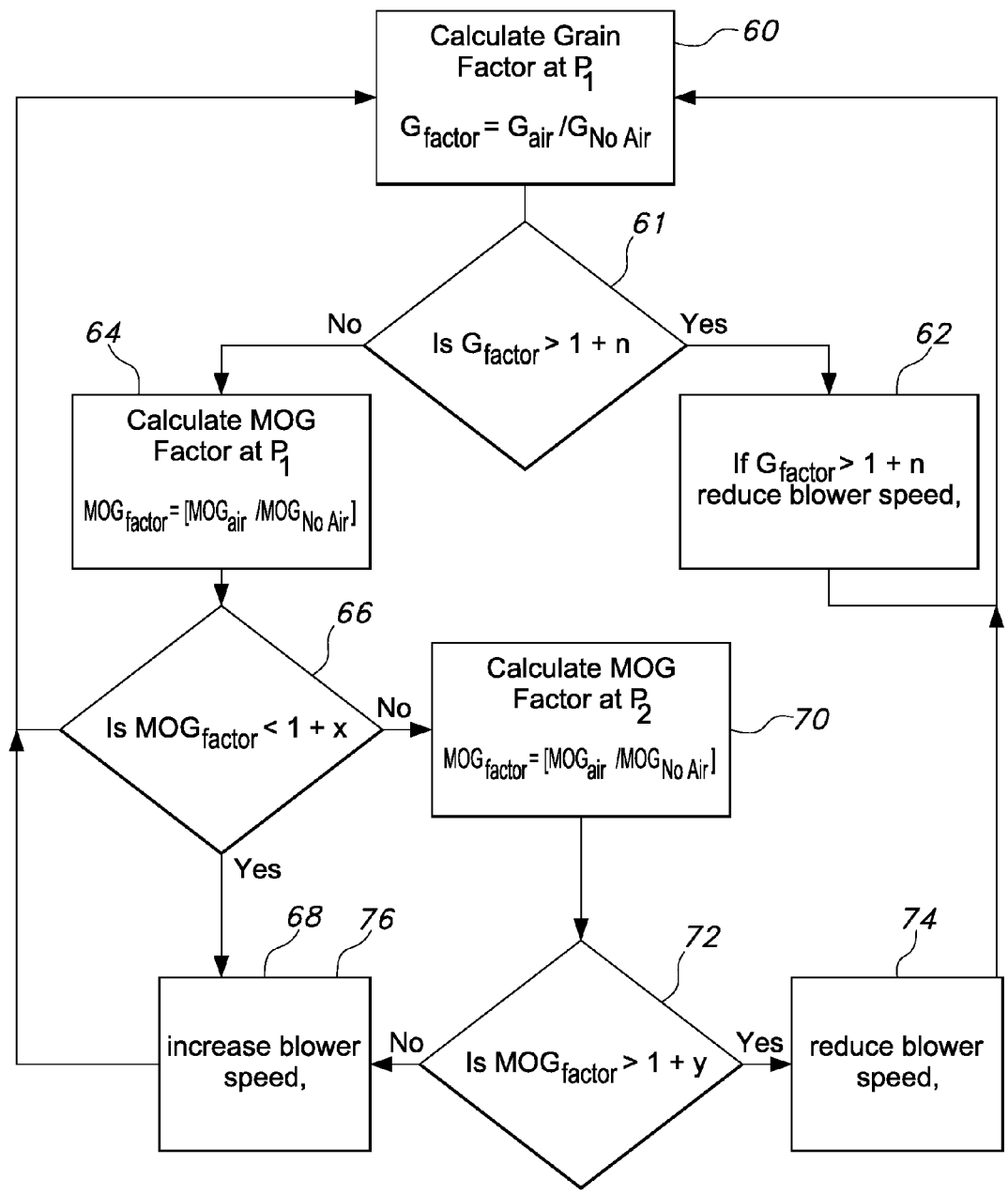
FIG. 2 is a block diagram illustrating a method of measuring and adjusting air flow through the combine harvester of FIG. 1 according to one embodiment of the invention.

Turning now to the embodiment illustrated in the flowchart shown in FIG. 2, in a first step 60, the G factor is calculated at P1. Point P1 is a point on the upper chaffer 36 that is just underneath the forward edge of the grain pan 34. Grain drops over the forward edge of the grain pan 34, so grain in the space between the upper chaffer 36 and the grain pan 34 rearward of point P1 is substantially the result of grain being entrained in the airstream from the blower 28. At 61, it is determined if the G factor at P1 is greater than 1+n, where n represents a desired factor. At step 62, if the G factor at P1 is greater than 1+n, then the blower is adjusted to reduce the fan speed or alter other blower parameters to cause a reduction in the rearward movement of grain. At step 64 if the G factor at P1 is less than 1+n, then the MOG factor is calculated at P1. At 66, it is determined if the MOG factor at P1 is less than 1+x, where x represents a desired factor. At 68, if the MOG factor at P1 is less than 1+x, then the blower 28 is adjusted to increase the airstream so as to entrain more MOG. At 70, if the MOG factor at P1 is greater than 1+x, then the MOG factor at P2 is calculated. At 72, it is determined if the MOG factor at P2 is greater than 1+y, where y represents a desired factor. At 74, if the MOG factor at P2 is greater than 1+y, the blower is adjusted to reduce the airstream. At 76 if the MOG factor at P2 is less than 1+y, then the blower is adjusted to increase the airstream.

The blower effectiveness measuring apparatus 50 may be used during initial testing of harvester 10 to determine suitable speeds or operating conditions for the blower 28 for general field or grain conditions, or the apparatus may be used periodically or even continuously during harvesting operations to monitor the effectiveness of the cleaning system 26 and provide periodic or continuous adjustments to the blower 28 to maximize blower effectiveness and efficiency.

In another embodiment, the blower effectiveness measuring apparatus 50 calculates a grain efficiency reading. The grain efficiency is calculated by summing the amount of grain collected by the collection device 52 at points between P0 and P2 and comparing to the amount of grain collected in the baseline samples with no blower air. In one embodiment, the grain efficiency is calculated using the formula in Equation 3:

$$\text{Grain Efficiency} = \frac{\Sigma \text{ Amount Grain (With Air)}}{\Sigma \text{ Amount Grain (No Air)}} \quad \text{(EQ. 3)}$$

The MOG efficiency is calculated by summing the amount of MOG collected by the collection device 52 at points between P0 and P2 and comparing to the amount of grain collected in the baseline samples with no blower air. In one embodiment, the MOG efficiency is calculated using the formula in Equation 4.

$$MOG \text{ Efficiency} = 1 - \frac{\Sigma \text{ Amount } MOG \text{ (With Air)}}{\Sigma \text{ Amount } MOG \text{ (No Air)}} \quad \text{(EQ. 4)}$$

Figure 3:
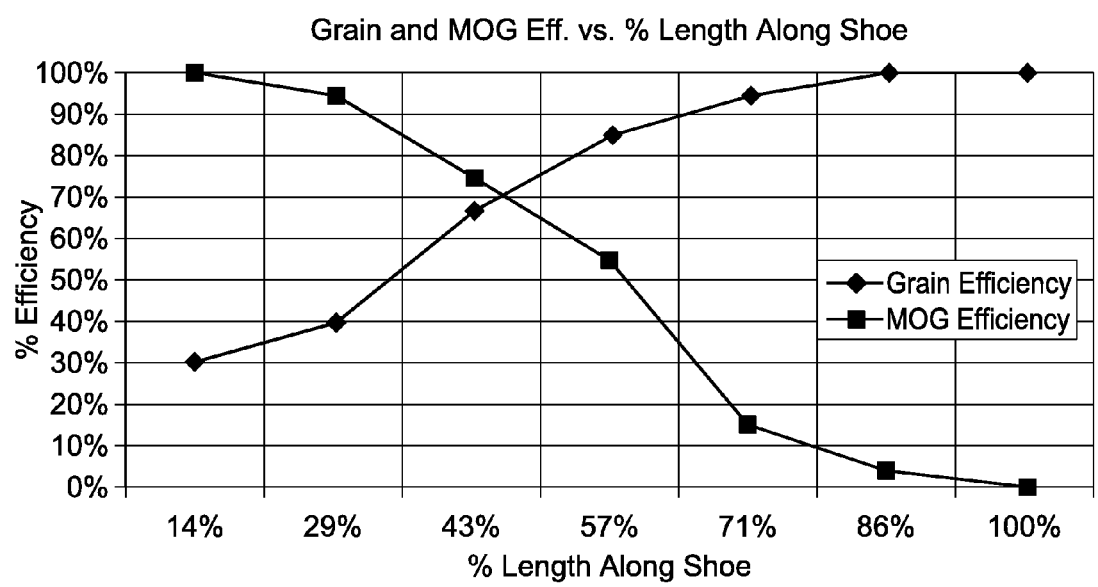
FIG. 3 is a graph representing grain and MOG efficiencies of the cleaning apparatus of the combine harvester.

The Grain efficiency and the MOG efficiency can be plotted as shown in FIG. 3

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method of managing the airflow of a blower mechanism through the threshing and cleaning systems of a combine harvesting machine, the method comprising:

calculating a G factor at a first point on an upper chaffer that is just underneath the forward edge of a grain pan to determine if the G factor at said first point is greater than 1+n, where n represents a desired factor;

adjusting the blower mechanism to cause a reduction in the rearward movement of grain if the G factor at said point is greater than 1+n;

calculating a MOG factor is calculated at said first point if the G factor calculated at said point is less than 1+n;

adjusting the blower mechanism to increase the airstream so as to entrain more MOG if the MOG factor at said first point is less than 1+x, where x represents a desired factor;

calculating a MOG factor at a second point if the MOG factor at said first point is greater than 1+x;

adjusting the blower to reduce the airstream if it is determined the MOG factor at said second point is greater than 1+y, where y represents a desired factor; and adjusting the blower to increase the airstream if it is determined the MOG factor at said second point is less than 1+y.

2. The method of claim 1 wherein adjusting the blower mechanism comprises reducing the speed of the blower.

\* \* \* \* \*